United States Patent [19]

Colonias

[11] Patent Number: 4,890,436

[45] Date of Patent: Jan. 2, 1990

[54] MULTIPLE WOOD TRUSS CONNECTION

[75] Inventor: Karen W. Colonias, Lafayette, Calif.

[73] Assignee: Simpson Strong-Tie Company, Inc., San Leandro, Calif.

[21] Appl. No.: 227,727

[22] Filed: Aug. 3, 1988

[51] Int. Cl.⁴ .............................................. E04B 1/38
[52] U.S. Cl. ....................................... 52/643; 52/702; 52/712; 248/248; 403/232.1
[58] Field of Search ................. 52/702, 712, 713, 714, 52/715, 643, 646, 648; 403/170, 171, 230, 232.1; 248/248

[56] References Cited

U.S. PATENT DOCUMENTS

| | | | |
|---|---|---|---|
| 3,333,875 | 8/1967 | Tracy | 403/170 |
| 3,423,898 | 1/1969 | Tracy et al. | 52/702 |
| 3,481,635 | 12/1969 | Tracy | 403/232.1 |
| 4,230,416 | 10/1980 | Gilb | 52/702 |
| 4,261,155 | 4/1981 | Gilb | 52/702 |
| 4,423,977 | 1/1984 | Gilb | 52/702 |
| 4,665,672 | 5/1987 | Commins et al. | 52/702 |
| 4,717,279 | 1/1988 | Commins | 403/232.1 |

Primary Examiner—Michael Safavi
Attorney, Agent, or Firm—James R. Cypher

[57] ABSTRACT

A multiple wood truss connection in which from three to five hip and jack trusses may be supported by a single sheet metal connector at from two to three location and connected to a carrying girder. Each carried truss is supported on a common seat and individually supported by nailing to sidwalls and tab members. The sheet metal connector is bolted and nailed to a vertical king post member on the carrying girder. The sheet metal connector is formed with overlapping back members which enable the connector to carry very large loads and to be connected to relatively narrow king posts. No welding of the sheet metal connector is required or desired.

4 Claims, 10 Drawing Sheets

MULTIPLE WOOD TRUSS CONNECTION

BACKGROUND OF THE INVENTION

This invention relates to a multiple wood truss connection in which a total of three to five hip and jack trusses may be supported by a metal connector at from two to three locations which is connected to a wood carrying girder, particularly in the construction of buildings with hip roofs.

Present connectors for wood trusses are custom made from metal plates which are joined by welding and then painted. These connectors are heavy, expensive, have limited holding capacity, and provide limited resistance to truss overturn and uplift forces.

SUMMARY OF THE PRESENT INVENTION

The gist of the present invention is the construction of a wood truss connection capable of holding multiple trusses including a metal connector which is made from a single galvanized sheet metal member and requires no welding or painting.

The metal connector of the present invention in a truss connection is significantly less expensive to make and install than previous welded truss connectors.

A further advantage of the present connection is that it provides overturn support for the carried trusses, and installation is simpler since each carried truss can be attached to the metal connector without waiting for the other carried trusses to be seated on the connector.

A further feature of the present invention is the fact that the back of the connector is attached to the king post member of the carrying member which is the strongest part of the carrying truss.

Another advantage of the present connection is the fact that the king post may be narrower than king posts used with prior art connectors.

Still another advantage of the present connection is the fact that it can carry greater loads at less cost than prior truss connections.

DESCRIPTION OF THE PREFERRED EMBODIMENTS

Figure 1:
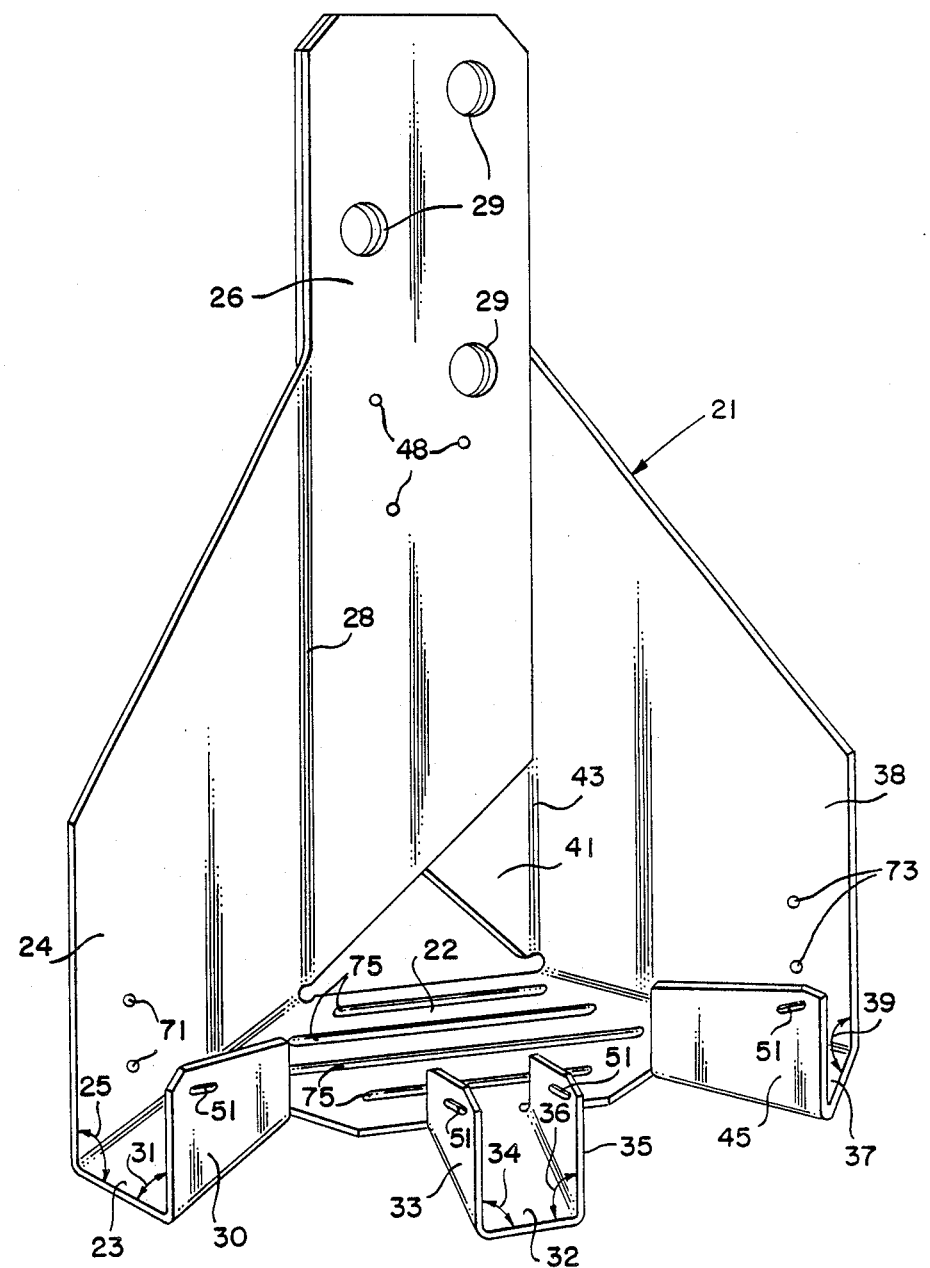
FIG. 1 is a perspective view of the metal connector used in the multiple truss connection of the present invention.
Figure 2:
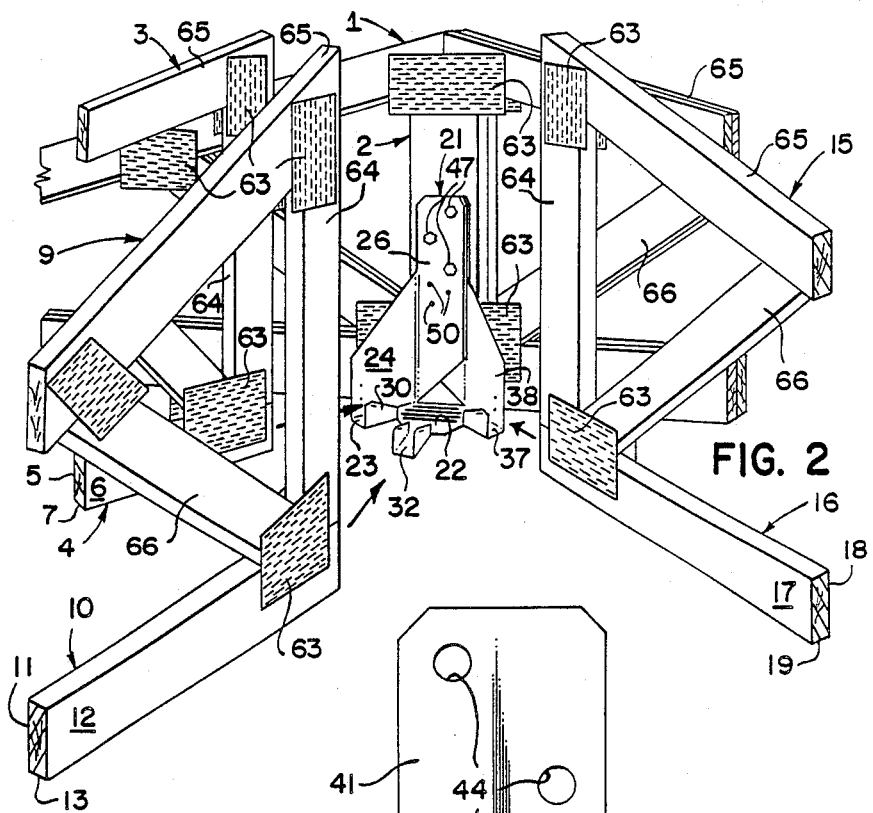
FIG. 2 is a perspective view illustrating the components of the connection including the metal connector illustrated in FIG. 1.
Figure 5:
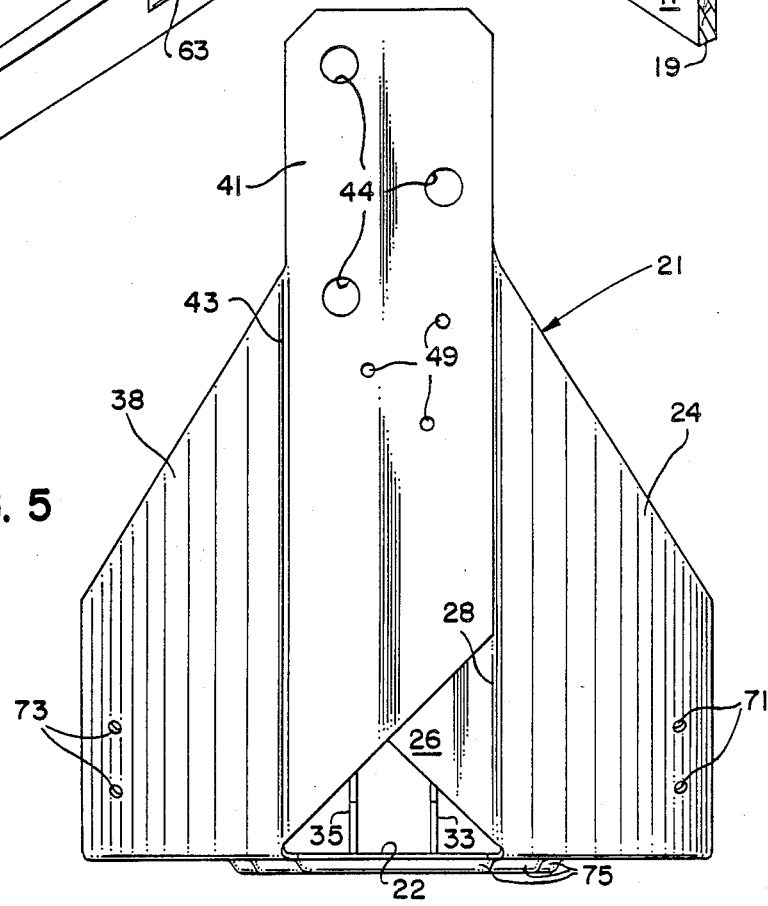
FIG. 5 is a rear elevation view of the connector shown in FIG. 1.
Figure 3:
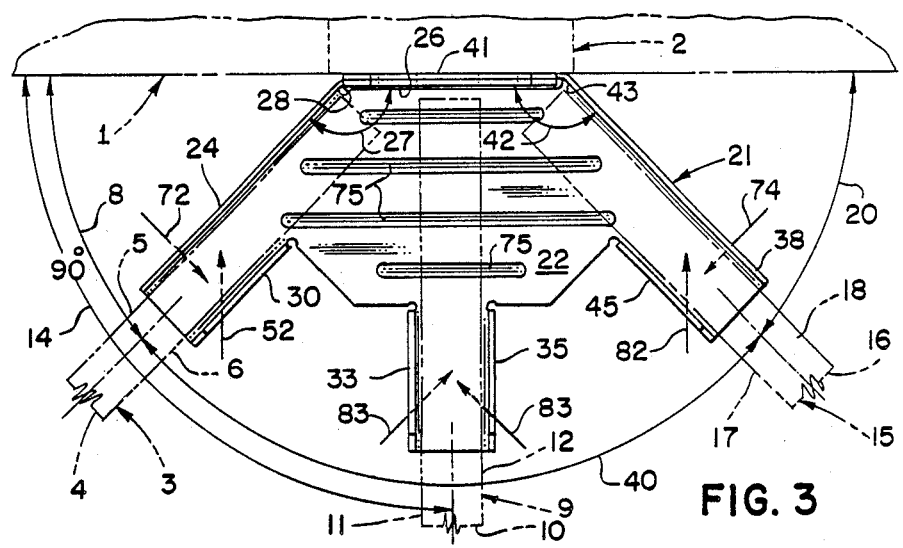
FIG. 3 is a plan view of the connection including the connector of FIG. 1. The carried trusses and the carrying girder components of the connection illustrated in FIG. 2 are shown in phantom line.
Figure 4:
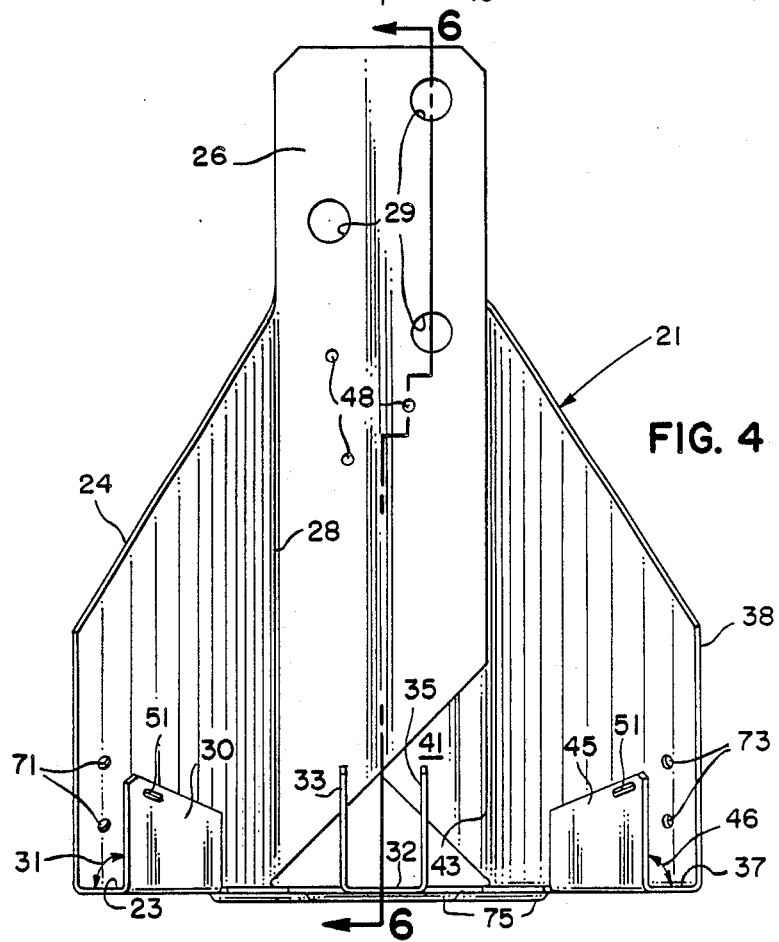
FIG. 4 is a front elevation view of the connector shown in FIG. 1.
Figure 6:
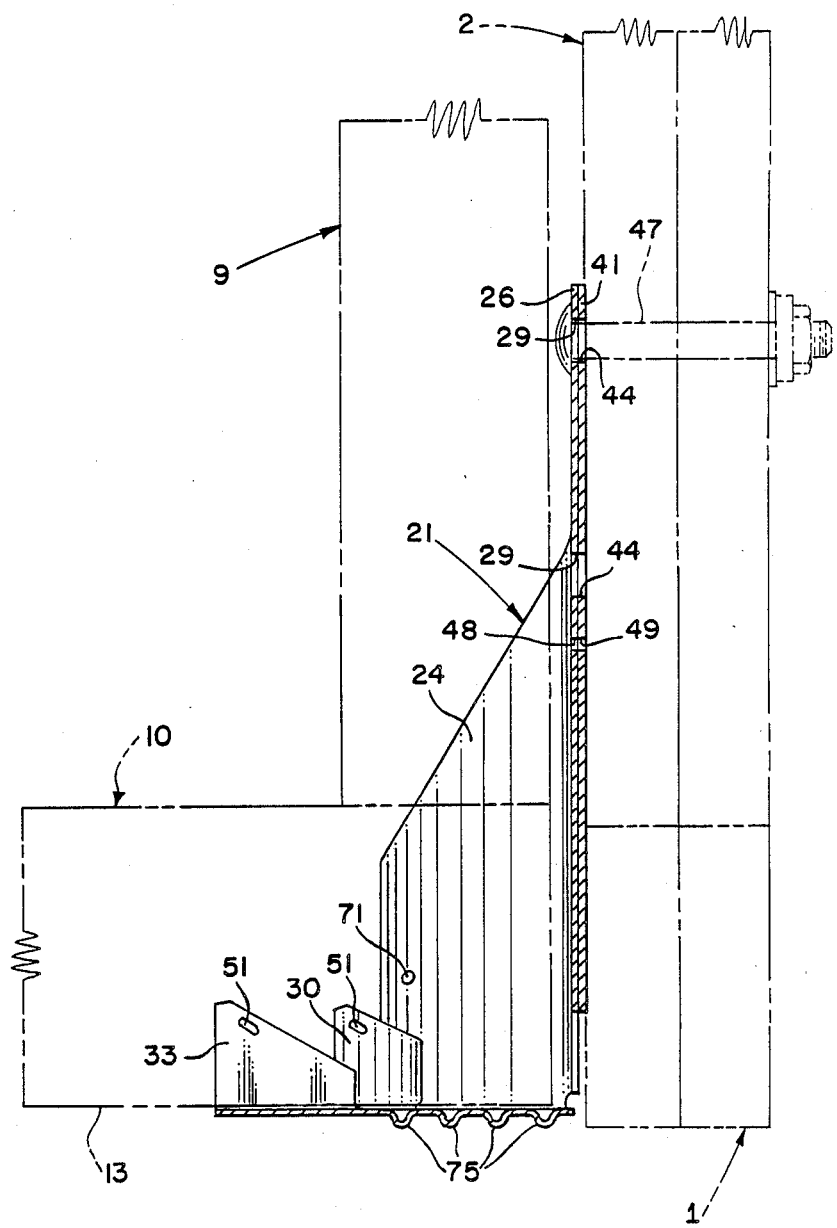
FIG. 6 is a sectional view taken along line 6—6 in FIG. 4.

The multiple wood truss connection of the present invention illustrated in FIGS. 1–7 includes: a carrying wood truss girder 1 having a vertical wood king post member 2; a first carried wood hip truss 3 having a wood bottom chord member 4 having first and second sides 5 and 6 and a bottom edge 7 and the first carried wood hip truss 3 is disposed at an angle 8 to the carrying wood truss girder 1 of less than 90°; a carried wood jack truss 9 having a wood bottom chord member 10 having first and second sides 11 and 12 and a bottom edge 13 and the carried wood jack truss 9 is disposed at an angle 14 to the carrying wood truss girder 1 of approximately 90°; a second carried wood hip truss 15 having a wood bottom chord member 16 having first and second sides 17 and 18 and a bottom edge 19 and the second carried wood hip truss 15 is disposed at an angle 20 to the carrying wood truss girder 1 of less than 90°, and may be disposed at an angle of about 90° to the first carried wood hip truss 3.

The improvement includes a metal connector 21 which after nailing, becomes an integral part of the connection and includes: a common seat member 22; a first hip seat member 23 extending from the common seat member 22 for receiving the bottom edge 7 of the bottom chord 4 of the first carried wood hip truss 3; a first hip sidewall 24 connected to and disposed at an angle 25 of generally 90° to the common seat member 22 and the first hip seat member 23 for receiving the first side 5 of the wood bottom chord 4 of the first carried wood hip truss 3; a first back member 26 connected to and disposed at an angle 27 to the first hip side wall 24 along a first back bend line 28, and the first back member 26 is formed with a plurality of fastener holes 29 therethrough; a first hip tab 30 connected to and disposed at an angle 31 of generally 90° to the first hip seat member 23 and laterally disposed from the first hip sidewall 24 for receiving the second side 6 of the wood bottom chord 4 of the first carried wood hip truss 3; a jack seat 32 extending from the common seat member 22 for receiving the bottom edge 13 of the bottom chord 10 of the carried wood jack truss 9; a first jack tab 33 connected to and disposed at an angle 34 of generally 90° to the jack seat 32 for receiving the first side 11 of the bottom chord 10 of the carried wood jack truss 9; a second jack tab 35 connected to and disposed at an angle 36 of generally 90° to the jack seat 32 and laterally disposed from the first jack tab 33 for receiving the second side 12 of the bottom chord 10 of the carried wood jack truss 9; a second hip seat member 37 extending from the common seat member 22 for receiving the bottom edge 19 of the bottom chord 16 of the second carried wood hip truss 15; a second hip sidewall 38 connected to and disposed at an angle 39 of generally 90° to the common seat member 22 and the second hip seat member 37, and disposed at an angle 40 of generally 90° to the first hip sidewall 24, for receiving the second side 18 of the wood bottom chord 16 of the second carried wood hip truss 15; a second back member 41 connected to and disposed at an angle 42 to the second hip side wall 38 along a second back bend line 43, and the second back member 41 is formed with a plurality of fastener holes 44, at least one of which is in registration with one of the fastener holes 29 in the first back member 26, and the second back member 41 is disposed in overlapped registration with the first back member 26; a second hip tab 45 connected to and disposed at an angle 46 of generally 90° to the second hip seat member 37 and disposed laterally from the second hip sidewall 38 for receiving the first side 17 of the wood bottom chord 16 of the second carried wood hip truss 15; girder fastener means 47 dimensioned for insertion through the fastener holes 29 and 44 in the first and second back members 26 and 41 and into the vertical wood king post member 2 of the carrying wood truss girder 1; first hip sidewall fastener means 72 joining the first hip sidewall 24 of the metal connector and the wood bottom chord 4 of the first carried wood hip truss 3; second hip sidewall fastener means 74 joining the second hip sidewall 38 of the metal connector and the wood bottom chord 16 of the second carried wood hip truss 15; first hip tab fastener means 52 joining the first hip tab 30 to the wood bottom chord 4 of the first carried wood hip truss 3; second hip tab fastener means 82 joining the second hip tab 45 to the wood bottom chord 16 of the second carried wood hip truss 15; and jack tab fastener means 83 joining the first and second jack tabs 33 and 35 to the bottom wood chord 10 of the first carried wood jack truss 9.

Nail openings 71 are formed in first hip sidewall 24 for insertion of nails 72 therethrough and into the bottom chord of the hip jack truss. In addition, nail openings 73 are formed in second hip sidewall 38 for insertion of nails 74 therethrough and into the bottom chord of the wood carried hip truss.

In order to increase the load capacity of the multiple wood truss connection as previously described the first and second back members 26 and 41 of the metal connector 21 are formed with a plurality of nail openings 48 and 49 disposed in registration with one another; and a plurality of nails 50 are inserted through the nail openings in the first and second back members 26 and 41 and inserted into the carrying wood king post member 2 of the carrying wood truss girder 1. The nails further assist in preventing spreading of the first and second back members 26 and 41 and also add shear holding value to the connection.

Preferably, the multiple wood truss connection as described may be further constructed so that the first hip tab 30, the first and second jack tabs 33 and 35, and the second hip tab 45 are each formed with a slotted opening 51; and the first hip tab fastener means 52, the second hip tab fastener means 82 and the jack tab fastener means 83 are respectively inserted through the slotted openings at a selected angle to the slots.

Another form of the invention is illustrated in FIGS. 8–11. Where parts of the modified form are similar to the preferred form previously described, identical numbers are used but with the addition of a prime (') mark. Additional or different parts are given a new number.

The modified multiple wood truss connection includes: a carrying wood truss girder 1' having a vertical wood king post member 2'; a first carried wood hip truss 3' having a wood bottom chord member 4' having first and second sides 5' and 6' and a bottom edge (not shown) and the first carried wood hip truss 3' is disposed at an angle to the carrying wood truss girder 1' of less than 90°; a second carried wood hip truss 59 having a wood bottom chord member 60 having first and second sides 61 and 62 and a bottom edge disposed in side by side relationship with the first carried wood hip truss 3'; a carried wood jack truss 9' having a wood bottom chord member 10' having first and second sides 11' and 12' and a bottom edge (not shown) and the carried wood jack truss 9 is disposed at an angle 14' to the carrying wood truss girder of approximately 90°.

The improvement includes a metal connector 54 having: a common seat member 22'; a hip seat member 23' extending from the common seat member 22' for receiving the bottom edge of the bottom chord 4' of the first carried wood hip truss 3' and the bottom chord 60 of the second carried wood hip truss 59 in side by side relationship; a hip sidewall 24' connected to and disposed at an angle 25' of generally 90° to the common seat member 22' and the hip seat member 23' for receiving the first side 5' of the wood bottom chord 4' of the first carried wood hip truss 3'; a first back member 26' connected to and disposed at an angle 27' to the hip side wall 24' along a first back bend line 28', and the first back member 26' is formed with a plurality of fastener holes 29' therethrough; a hip tab 30' connected to and disposed at an angle 31' of generally 90° to the hip seat member 23' and laterally disposed from the hip sidewall 24' for receiving the second side 62 of the bottom chord 60 of the second carried wood hip truss 59; a jack seat 32' extending from the common seat 22' member for receiving the bottom edge of the bottom chord 10' of the carried wood jack truss 9'; a jack tab 33' connected to and disposed at an angle 34' of generally 90° to the jack seat 32' for receiving the first side 11' of the bottom chord 10' of the carried wood jack truss 9'; a jack sidewall 55 connected to and disposed at an angle 39' of generally 90° to the common seat member 22' and the jack seat member 32', and disposed at an angle 56 of generally less than 90° to the hip sidewall 24', for receiving the second side 12' of the wood bottom chord 10' of the carried wood jack truss 9'; a second back member 41' connected to and disposed at an angle 57 to the jack side wall 55 along a second back bend line 58, and the second back member 41' is formed with a plurality of fastener holes 44', at least one of which is in registration with one of the fastener holes 29' in the first back member 26', and the second back member 41' is disposed in overlapped registration with the first back member 26''; fastener means such as bolts dimensioned for insertion through the fastener holes 29' and 44' in the first and second back members 26' and 41' and into the vertical wood king post member 2' of the carrying wood truss girder 1'; hip sidewall fastener means 68 joining the hip sidewall 24' of the metal connector and the wood bottom chord 4' of the first carried wood hip truss 3'; hip tab fastener means 52' joining the hip tab 30' to the wood bottom chord 60 of the second carried wood hip truss 59; jack tab fastener means 83' joining the jack tab 33' to the bottom wood chord 10' of the carried wood jack truss 9'; and jack sidewall fastener means 70 joining the jack sidewall 55 to the wood bottom chord 10' of the carried wood jack truss 9'.

In order to increase the load capacity of the multiple wood truss connection shown in FIGS. 8–11, the first and second back members 26' and 41' of the metal connector 54 are formed with a plurality of nail openings 48' and 49' disposed in registration with one another; and a plurality of nails (not shown) dimensioned for insertion through the nail openings 48' and 49' in the first and second back members 26' and 41' are inserted into the carrying wood king post member 2' of the carrying wood truss girder 1'.

1 Preferably, the multiple wood truss connection as described in FIGS. 8-11 is constructed so that the hip tab 30', and the jack tab 33', are each formed with a slotted opening 51'. Hip tab fastener means 52' and jack tab fastener means 83' are respectively inserted through the slotted openings 51' at a selected angle to the slotted openings.

Figure 12:
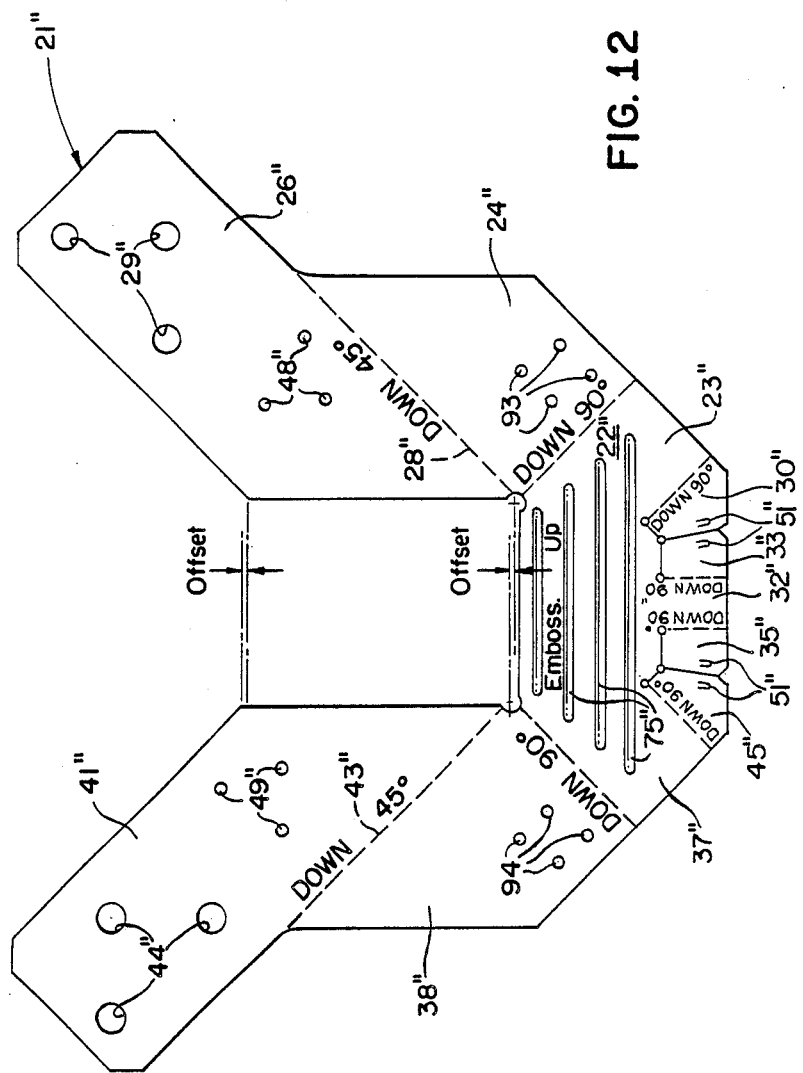
FIG. 12 is a plan view of the blank from which the modified connector shown in FIG. 13 is constructed.
Figure 13:
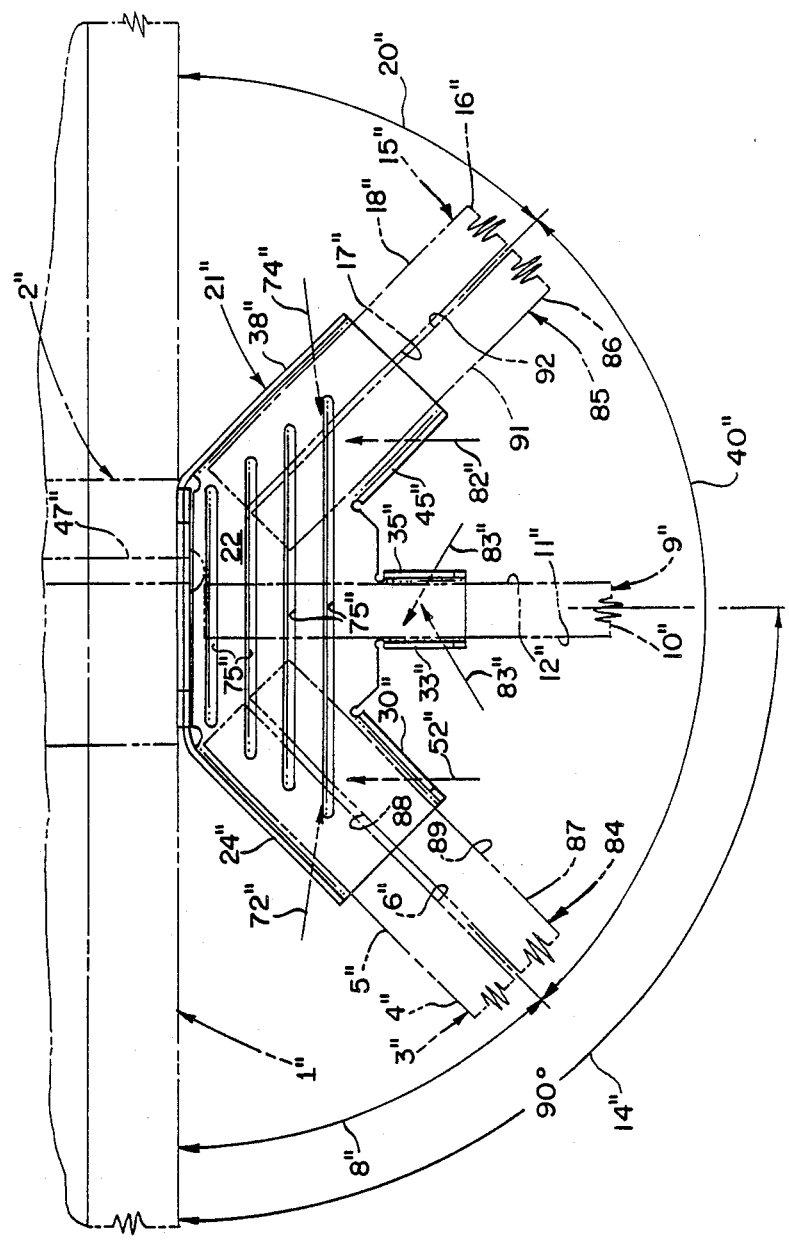
FIG. 13 is a plan view of the modified form of the invention including the connector shown in FIG. 12 showing a truss connection of five wood trusses at three locations. The trusses are shown in phantom line.

In the form of the invention illustrated in FIGS. 1-7, three trusses are carried by the connector 1 at three locations. In FIGS. 12 and 13 a modification of the connector 1 shown in FIGS. 1-7 is illustrated. The multiple wood truss connection includes: a carrying wood truss girder 1" having a vertical wood king post member 2"; a first carried wood hip truss 3" having a wood bottom chord member 4" having first and second sides 5" and 6" and a bottom edge and the first carried wood hip truss 3" is disposed at an angle 8" to the carrying wood truss girder 1" of less than 90°; a carried wood jack truss 9" having a wood bottom chord member 10" having first and second sides 11' and 12" and a bottom edge and the carried wood jack truss 9" is disposed at an angle 14" to the carrying wood truss girder 1" of approximately 90°; a second carried wood hip truss 15" having a wood bottom chord member 16; having first and second sides 17" and 18" and a bottom edge and the second carried wood hip truss 15" is disposed at an angle 20" to the carrying wood truss girder 1" of less than 90°, and is disposed at an angle of about 90° to the first carried wood hip truss 3"; a third carried wood hip truss 84 having a wood bottom chord member 87 having first and second sides 88 and 89 and a bottom edge disposed in side by side relationship with the first carried wood hip truss 3"; a fourth carried wood hip truss 85 having a wood bottom chord member 86 having first and second sides 91 and 92 and a bottom edge disposed in side by side relationship with the second carried wood hip truss 15".

The metal connector 21" includes: a common seat member 22"; a first hip seat member 23" extending from the common seat member 22" for receiving the bottom edges of the bottom chords 4" and 87 of the first and third carried wood hip trusses 3" and 84; a first hip sidewall 24" connected to and disposed at an angle of generally 90° to the common seat member 22" and the first hip seat member 23" for receiving the first side 5" of the wood bottom chord 4" of the first carried wood hip truss 3"; a first back member 26" connected to and disposed at an angle to the first hip side wall 24" along a first back bend line 28" and the first back member 26" is formed with a plurality of fastener holes 29" therethrough; a first hip tab 30" connected to and disposed at an angle of generally 90° to the first hip seat member 23" and laterally disposed from the first hip sidewall 24" for receiving the second side 89 of the wood bottom chord 87 of the third carried wood hip truss 84; a jack seat 32" extending from the common seat member 22" for receiving the bottom edge of the bottom chord 10" of the carried wood jack truss 9"; a first jack tab 33" connected to and disposed at an angle of generally 90° to the jack seat 32" for receiving the first side 11" of the bottom chord 10" of the carried wood jack truss 9"; a second jack tab 35" connected to and disposed at an angle of generally 90° to the jack seat 32" and laterally disposed from the first jack tab 33" for receiving the second side 12" of the bottom chord 10" of the carried wood jack truss 9"; a second hip seat member 37" extending from the common seat member 22" for receiving the bottom edges of the bottom chords 16" and 86 of the second and fourth carried wood hip trusses 15" and 85; a second hip sidewall 38" connected to and disposed at an angle of generally 90° to the common seat member 22" and the second hip seat member 37", and disposed at an angle of generally 90° to the first hip sidewall 24", for receiving the second side 18" of the wood bottom chord 16" of the second carried wood hip truss 15"; a second back member 41" connected to and disposed at an angle to the second hip side wall 38" along a second back bend line 43", and the second back member 41" is formed with a plurality of fastener holes 44", at least one of which is in registration with one of the fastener holes in the first back member 26", and the second back member 41" is disposed in overlapped registration with the first back member 26"; a second hip tab 45" connected to and disposed at an angle of generally 90° to the second hip seat member 37" and disposed laterally from the second hip sidewall 38" for receiving the first side 91 of the wood bottom chord 86 of the fourth carried wood hip truss 85; girder fastener means 47" dimensioned for insertion through the fastener holes 29" and 44" in the first and second back members 26" and 41" and into the vertical wood king post member 2" of the carrying wood truss girder 1"; first hip sidewall fastener means 72" joining the first hip sidewall 24" of the metal connector 21" and the wood bottom chord 4" of the first carried wood hip truss 3"; second hip sidewall fastener means 74" joining the second hip sidewall 38" of the metal connector 21" and the wood bottom chord 16" of the second carried wood hip truss 15"; first hip tab fastener means 52" joining the first hip tab 30" to the wood bottom chord 87 of the third carried wood hip truss 84; second hip tab fastener means 82" joining the second hip tab 45" to the wood bottom chord 86 of the fourth carried wood hip truss 85; and jack tab fastener means 83" joining the first and second jack tabs 33" and 35" to the bottom wood chord 10" of the first carried wood jack truss 9".

Embossments 75" are formed in common seat 22" to stiffen and strengthen the seat.

The trusses used in the connection are generally constructed from 2× lumber including vertical end members 64, top members 65, and brace members 66 and the lumber elements are generally connected together by prong plates 63. For the example of this disclosure, the maximum bottom chord size is a 2×6 and the minimum vertical wood king post member is a 2×6. The metal connector member is preferably constructed from 14 gauge galvanized steel. Three $\frac{3}{4}$" bolts are used to connect the metal connector to the carrying member together with three 16d nails. Three 10d×1½" nails are used to connect each hip truss to the connector and 2 10d 1½" nails are used to connect the jack truss to the connector. The average ultimate load has been determined by test to be 28,833 pounds with an allowable uplift load of 550 pounds. Allowable loads permitted by code depend upon the length of the bolt members in the wood member as follows: 1½" - 4065 pounds; 3" - 7695 pounds; 4½" - 8,280 pounds; and 6" - 8,280 pounds.

Some key dimensions of the form of the invention illustrated in FIGS. 1-7 are as follows: width of back members - 4¼"; height of back members 16½"; width of hip sidewalls 5¾"; width of seat members 1⅜"; diameter of bolt openings 13/16"; height of tab members 2⅜".

Some key dimensions of the form of the invention illustrated in FIGS. 8–11 are as follows: height of back members 16½"; width of back members 4 5/16", width of jack seat 1¼"; width of hip seat 3½"; length of common seat and jack seat 7"; and bolt hole openings 13/16".

In use, the connection is constructed by first bolting and nailing the connector to the king post of the carrying truss, The hip and jack trusses are then placed on their respective seats on the connector and nailed to the connector through the nail holes provided. An advantage of the present connector is that the hip and jack trusses can be placed one at a time on the connector seat and immediately nailed. It is not necessary to place all of the hip and jack trusses on the connector before beginning to nail as in the prior art connectors.

The connector is designed so that it may be cut and bent on an automatic machine. No welding is required or desired. Embossments 75 in the common seat area 22 add strength to the seat an prevent buckling of the seat.

Figure 7:
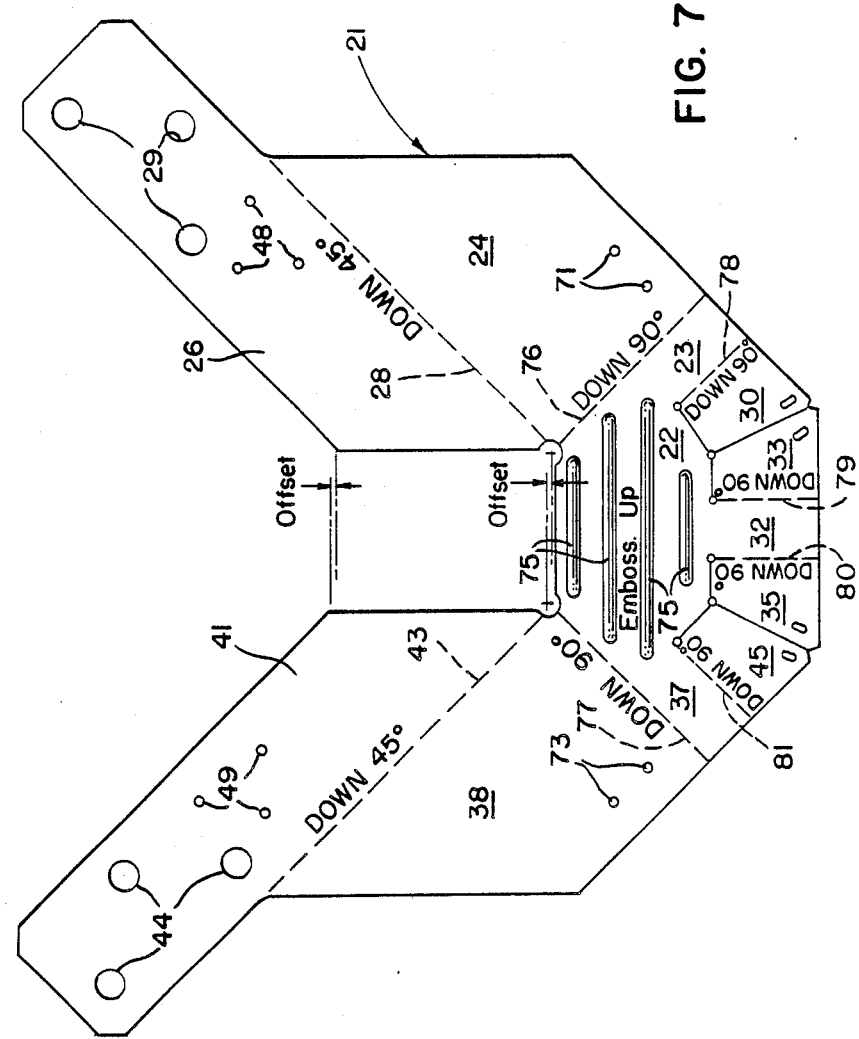
FIG. 7 is a plan view of the blank shown from the under side from which the connector shown in FIG. 1 is constructed.
Figure 8:
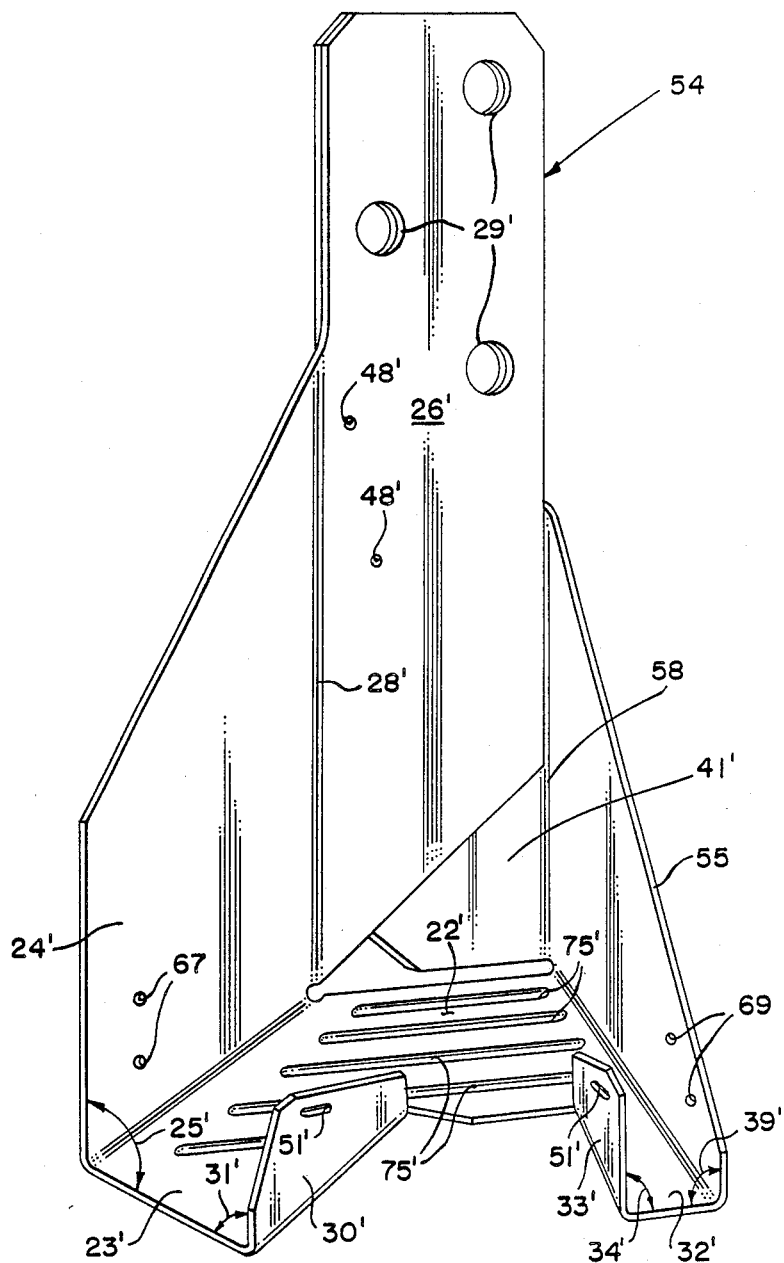
FIG. 8 is a perspective view of a modified connector used in another form of the invention.
Figure 9:
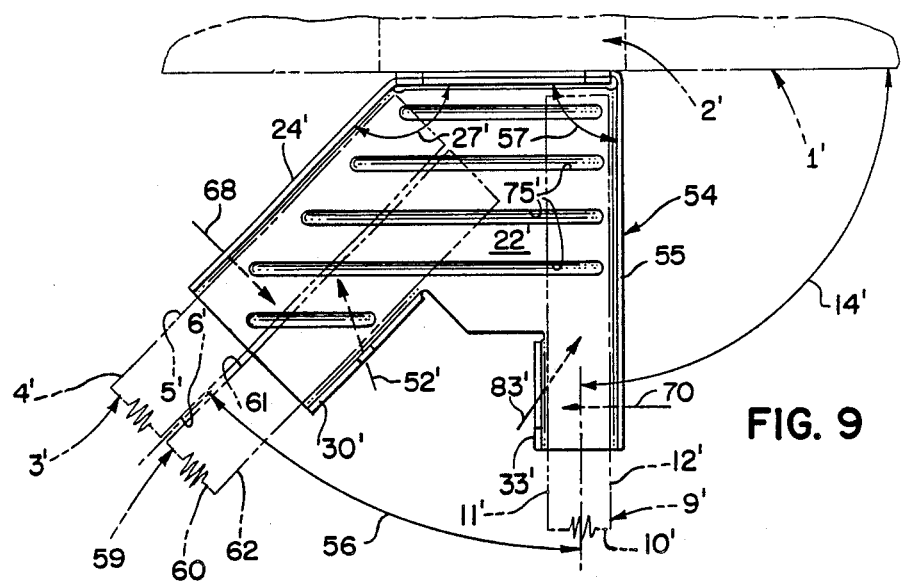
FIG. 9 is a top plan view of the connector shown in FIG. 8. The carried and carrying trusses of the connection of the modified form are shown in phantom line.
Figure 10:
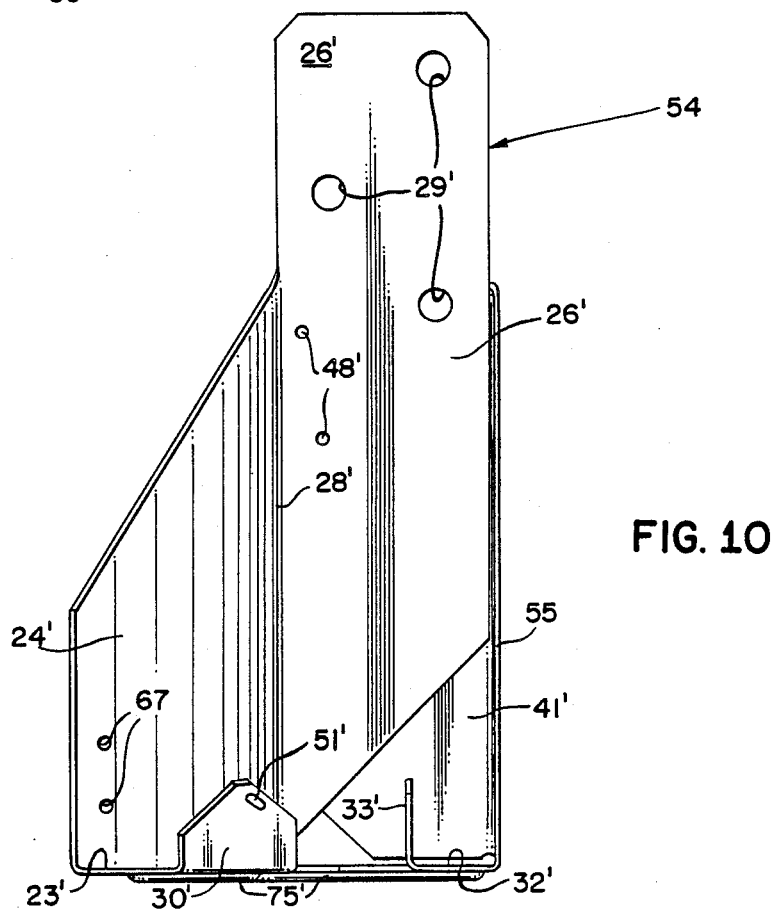
FIG. 10 is a front elevational view of the connector shown in FIG. 8.
Figure 11:
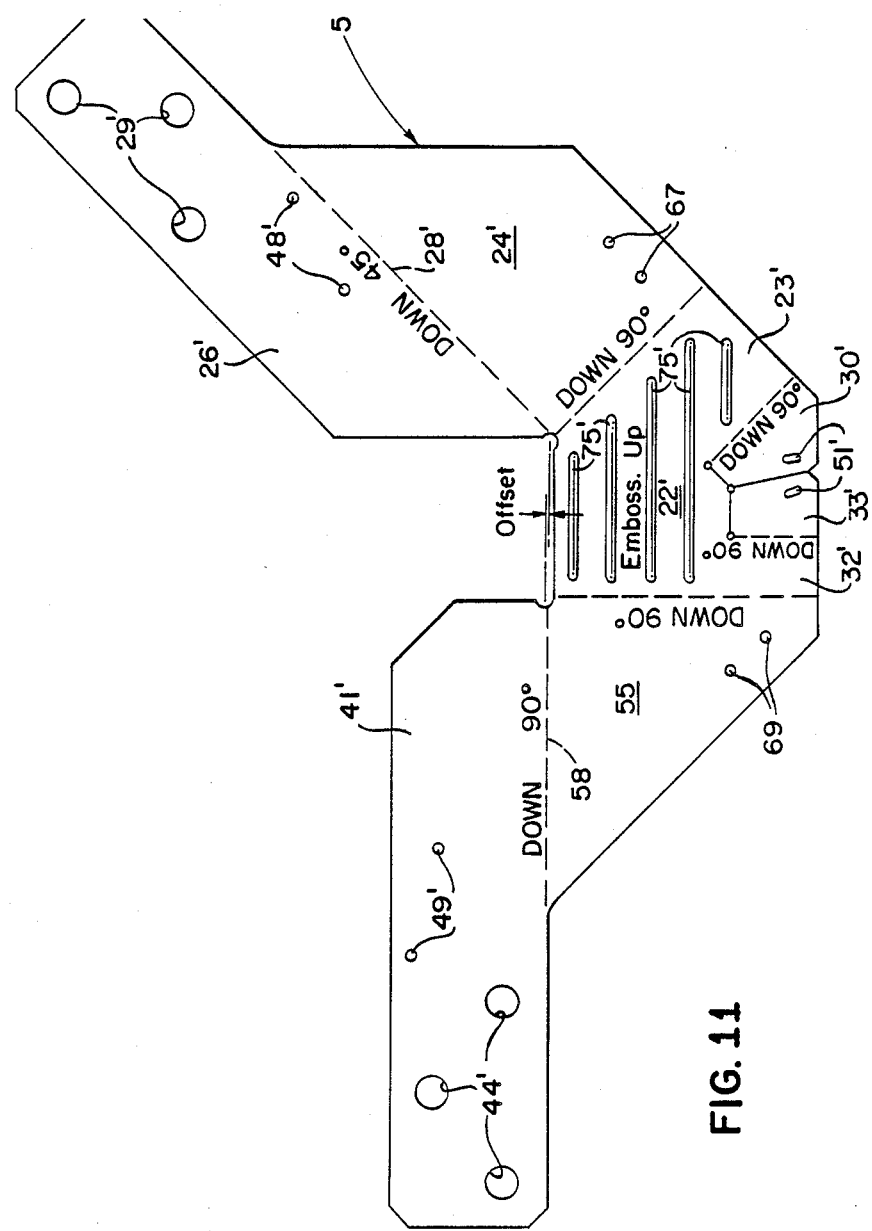
FIG. 11 is a plan view of the blank from which the connector shown in FIG. 8 is constructed.

The connector 21, as shown in FIG. 7 is constructed from a single sheet metal blank. After being cut as illustrated, first back member 26 is bent down 45° along bend line 28; second back member 41 is bent down 45° along bend line 43; first hip sidewall is bent down 90° along bend line 76; second hip sidewall 38 is bent down 90° along bend line 77; first hip tab 30 is bent down 90° along bend line 78; first jack tab is bent down 90° along bend line 79; second jack tab 35 is bent down 90° along bend line 80; and second hip tab 45 is bent down 90° along bend line 81.

I claim:

1. In a multiple wood truss connection including:
   a. a carrying wood truss girder having a vertical wood king post member;
   b. a first carried wood hip truss having a wood bottom chord member having first and second sides and a bottom edge and said first carried wood hip truss is disposed at an angle to said carrying wood truss girder of less than 90°;
   c. a carried wood jack truss having a wood bottom chord member having first and second sides and a bottom edge and said carried wood jack truss is disposed at an angle to said carrying wood truss girder of approximately 90°;
   d. a second carried wood hip truss having a wood bottom chord member having first and second sides and a bottom edge and said second carried wood hip truss is disposed at an angle to said carrying wood truss girder of less than 90°, and is disposed at an angle of about 90° to said first carried wood hip truss;
   e. the improvement including a metal connector comprising:
      (1) a common seat member;
      (2) a first hip seat member extending from said common seat member for receiving said bottom edge of said bottom chord of said first carried wood hip truss;
      (3) a first hip sidewall connected to and disposed at an angle of generally 90° to said common seat member and said first hip seat member for receiving said first side of said wood bottom chord of said first carried wood hip truss;
      (4) a first back member connected to and disposed at an angle to said first hip side wall along a first back bend line, and said first back member is formed with a plurality of fastener holes therethrough;
      (5) a first hip tab connected to and disposed at an angle of generally 90° to said first hip seat member and laterally disposed from said first hip sidewall for receiving said second side of said wood bottom chord of said first carried wood hip truss;
      (6) a jack seat extending from said common seat member for receiving said bottom edge of said bottom chord of said carried wood jack truss;
      (7) a first jack tab connected to and disposed at an angle of generally 90° to said jack seat for receiving said first side of said bottom chord of said carried wood jack truss;
      (8) a second jack tab connected to and disposed at an angle of generally 90° to said jack seat and laterally disposed from said first jack tab for receiving said second side of said bottom chord of said carried wood jack truss;
      (9) a second hip seat member extending from said common seat member for receiving said bottom edge of said bottom chord of said second carried wood hip truss;
      (10) a second hip sidewall connected to and disposed at an angle of generally 90° to said common seat member and said second hip seat member, and disposed at an angle of generally 90° to said first hip sidewall, for receiving said second side of said wood bottom chord of said second carried wood hip truss;
      (11) a second back member connected to and disposed at an angle to said second hip side wall along a second back bend line, and said second back member is formed with a plurality of fastener holes, at least one of which is in registration with one of said fastener holes in said first back member, and said second back member is disposed in overlapped registration with said first back member;
      (12) a second hip tab connected to and disposed at an angle of generally 90° to said second hip seat member and disposed laterally from said second hip sidewall for receiving said first side of said wood bottom chord of said second carried wood hip truss;
   f. girder fastener means dimensioned for insertion through said fastener holes in said first and second back members and into said vertical wood king post member of said carrying wood truss girder;
   g. first hip sidewall fastener means joining said first hip sidewall of said metal connector and said wood bottom chord of said first carried wood hip truss;
   h. second hip sidewall fastener means joining said second hip sidewall of said metal connector and said wood bottom chord of said second carried wood hip truss;
   i. first hip tab fastener means joining said first hip tab to said wood bottom chord of said first carried wood hip truss;
   j. second hip tab fastener means joining said second hip tab to said wood bottom chord of said second carried wood hip truss; and
   k. jack tab fastener means joining said first and second jack tabs to said bottom wood chord of said first carried wood jack truss.

2. In a multiple wood truss connection as described in claim 1 comprising:
   a. said first and second back members of said metal connector are formed with a plurality of nail openings disposed in registration with one another; and
   b. a plurality of nails dimensioned for insertion through said nail openings in said first and second back members and insertion into said carrying wood king post member of said carrying wood truss girder.

3. In a multiple wood truss connection as described in claim 2 comprising:
   a. said first hip tab, said first and second jack tabs, and said second hip tab are each formed with a slotted opening; and
   b. said first hip tab fastener means, said second hip tab fastener means and said jack tab fastener means are respectively inserted through said slotted openings at a selected angle to said slots.

4. In a multiple wood truss connection including:
   a. a carrying wood truss girder having a vertical wood king post member;
   b. a first carried wood hip truss having a wood bottom chord member having first and second sides and a bottom edge and said first carried wood hip truss is disposed at an angle to said carrying wood truss girder of less than 90°;
   c. a carried wood jack truss having a wood bottom chord member having first and second sides and a bottom edge and said carried wood jack truss is disposed at an angle to said carrying wood truss girder of approximately 90°;
   d. a second carried wood hip truss having a wood bottom chord member having first and second sides and a bottom edge and said second carried wood hip truss is disposed at an angle to said carrying wood truss girder of less than 90°, and is disposed at an angle of about 90° to said first carried wood hip truss;
   e. a third carried wood hip truss having a wood bottom chord member having first and second sides and a bottom edge disposed in side by side relationship with said first carried wood hip truss;
   f. a fourth carried wood hip truss having a wood bottom chord member having first and second sides and a bottom edge disposed in side by side relationship with said second carried wood hip truss;
   g. the improvement including a metal connector comprising:
      (1) a common seat member;
      (2) a first hip seat member extending from said common seat member for receiving said bottom edges of said bottom chords of said first and third carried wood hip trusses;
      (3) a first hip sidewall connected to and disposed at an angle of generally 90° to said common seat member and said first hip seat member for receiving aid first side of said wood bottom chord of said first carried wood hip truss;
      (4) a first back member connected to and disposed at an angle to said first hip side wall along a first back bend line, and said first back member is formed with a plurality of fastener holes therethrough;
      (5) a first hip tab connected to and disposed at an angle of generally 90° to said first hip seat member and laterally disposed from said first hip sidewall for receiving said second side of said wood bottom chord of said third carried wood hip truss;
      (6) a jack seat extending from said common seat member for receiving said bottom edge of said bottom chord of said carried wood jack truss;
      (7) a first jack tab connected to and disposed at an angle of generally 90° to said jack seat for receiving said first side of said bottom chord of said carried wood jack truss;
      (8) a second jack tab connected to and disposed at an angle of generally 90° to said jack seat and laterally disposed from said first jack tab for receiving said second side of said bottom chord of said carried wood jack truss;
      (9) a second hip seat member extending from said common seat member for receiving said bottom edges of said bottom chords of said second and fourth carried wood hip trusses;
      (10) a second hip sidewall connected to and disposed at an angle of generally 90° to said common seat member and said second hip seat member, and disposed at an angle of generally 90° to said first hip sidewall, for receiving said second side of said wood bottom chord of said second carried wood hip truss;
      (11) a second back member connected to and disposed at an angle to said second hip side wall along a second back bend line, and said second back member is formed with a plurality of fastener holes, at least one of which is in registration with one of said fastener holes in said first back member, and said second back member is disposed in overlapped registration with said first back member;
      (12) a second hip tab connected to and disposed at an angle of generally 90° to said second hip seat member and disposed laterally from said second hip sidewall for receiving said first side of said wood bottom chord of said fourth carried wood hip truss;
   h. girder fastener means dimensioned for insertion through said fastener holes in said first and second back members and into said vertical wood king post member of said carryingwood truss girder;
   i. first hip sidewall fastener means joining said first hip sidewall of said metal connector and said wood bottom chord of said first carried wood hip truss;
   j. second hip sidewall fastener means joining said second hip sidewall of said metal connector and said wood bottom chord of said second carried wood hip truss;
   k. first hip tab fastener means joining said first hip tab to said wood bottom chord of said third carried wood hip truss;
   l. second hip tab fastener means joining said second hip tab to said wood bottom chord of said fourth carried wood hip truss; and
   m. jack tab fastener means joining said first and second jack tabs to said bottom wood chord of said first carried wood jack truss.

* * * * *